(12) United States Patent
Mody et al.

(10) Patent No.: US 11,763,513 B2
(45) Date of Patent: *Sep. 19, 2023

(54) DGPU ASSIST USING DSP PRE-PROCESSOR SYSTEM AND METHOD

(71) Applicant: Texas Instruments Incorporated, Dallas, TX (US)

(72) Inventors: Mihir Mody, Bangalore (IN); Hemant Hariyani, Plano, TX (US); Anand Balagopalakrishnan, Bangalore (IN); Jason Jones, Richmond, TX (US); Ajay Jayaraj, Sugar Land, TX (US); Manoj Koul, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/028,389

(22) Filed: Sep. 22, 2020

(65) Prior Publication Data

US 2021/0005005 A1      Jan. 7, 2021

Related U.S. Application Data

(63) Continuation of application No. 16/428,485, filed on May 31, 2019, now Pat. No. 10,818,067.

(51) Int. Cl.
*G06T 15/00* (2011.01)
*G06T 1/20* (2006.01)

(52) U.S. Cl.
CPC ............ *G06T 15/005* (2013.01); *G06T 1/20* (2013.01); *G06T 2200/28* (2013.01); *G06T 2210/52* (2013.01)

(58) Field of Classification Search
CPC ..... G06T 15/005; G06T 1/20; G06T 2210/52; G06T 2200/28
See application file for complete search history.

(56) References Cited

U.S. PATENT DOCUMENTS 7,468,726 B1 *  12/2008  Wloka ................... G06T 15/40
                                                        345/419
8,001,531 B1 *  8/2011  Rideout .............. G06F 11/3664
                                                        717/124

(Continued)

FOREIGN PATENT DOCUMENTS

GB            2545457 A  *  6/2017  ............... G06T 1/20

OTHER PUBLICATIONS

Mitra et al., Implementation and Optimizaton of the OpenMP Accelerator Model for the TI Keystone II Architecture, In: Using and Improving OpenMP for Devices, Tasks, and More, International Workshop on OpenMP, Springer, Cham, 2014. (Year: 2014).*

(Continued)

*Primary Examiner* — Said Broome
*Assistant Examiner* — Donna J. Ricks
(74) *Attorney, Agent, or Firm* — Michael T. Gabrik; Frank D. Cimino

(57) ABSTRACT

A method and system for dynamically transferring graphical image processing operations from a graphical processing unit (GPU) to a digital signal processor (DSP). The method includes estimating the number of operations needed for the processing a set of image data; determining the operational limits of a GPU and compare with estimated number of operations and if the operational limits are exceeded; transfer the processing operations to the DSP from the GPU. The transfer can include transferring a portion of executable code for performing the processing operations, and generating a replacement code for the GPU. The DSP can then process a portion of the image data before sending it to the GPU for further processing.

22 Claims, 9 Drawing Sheets

(56) References Cited

U.S. PATENT DOCUMENTS

| | | | | |
|---|---|---|---|---|
| 8,736,624 | B1* | 5/2014 | Mahan | G06T 15/005 345/522 |
| 10,818,067 | B1* | 10/2020 | Mody | G06T 15/005 |
| 2008/0094412 | A1* | 4/2008 | Jiao | G06T 15/30 345/621 |
| 2009/0141033 | A1* | 6/2009 | Street | G06T 1/20 345/506 |
| 2010/0110085 | A1* | 5/2010 | Samuel | G06F 3/14 345/519 |
| 2011/0018884 | A1* | 1/2011 | Ritts | G06T 15/005 345/522 |
| 2014/0092103 | A1* | 4/2014 | Saulters | G06F 1/206 345/501 |
| 2015/0052331 | A1* | 2/2015 | Dhurjati | G06F 8/44 712/30 |
| 2015/0145880 | A1* | 5/2015 | Smith | G06T 11/40 345/557 |
| 2016/0095057 | A1* | 3/2016 | Guy | H04W 8/24 709/224 |
| 2016/0379332 | A1* | 12/2016 | Krutsch | G06T 7/00 345/506 |
| 2017/0075734 | A1* | 3/2017 | Raman | G06F 9/5066 |
| 2018/0018751 | A1* | 1/2018 | Jiang | G06T 1/20 |
| 2019/0172213 | A1* | 6/2019 | Wicks | G06T 7/50 |
| 2020/0013184 | A1* | 1/2020 | Linde | G06T 7/73 |
| 2020/0082491 | A1* | 3/2020 | Harris | G06T 1/20 |

OTHER PUBLICATIONS

Mitra et al., Implementation and Optimization of the OpenMP Accelerator Model for the TI Keystone II Architecture, In: Using and improving OpenMP for Devices, Tasks and More,; International Workshop on OpenMP, Springer, Cham, 2014. (Year: 2014).

* cited by examiner

DGPU ASSIST USING DSP PRE-PROCESSOR SYSTEM AND METHOD

CROSS-REFERENCED TO RELATED APPLICATION

This application is a continuation of U.S. patent application Ser. No. 16/428,485, filed on May 31, 2019, which is incorporated herein by reference.

BACKGROUND

Technical Field

The present invention relates to a system and method for transferring operations from graphical applications between processors. Specifically, the present invention relates to dynamically transferring computation operations from a graphical processor unit to a digital signal processor.

Description of Related Art

A graphics processing unit (GPU) is a processor for accelerating the manipulation, rendering, and storage of images. A GPU transforms a 3D scene into a 2D image representing the 3D scene via a series of shading, assembly, and rendering operations for an image or frame. This series of operations is colloquially referred to as a GPU pipeline. A GPU pipeline may also be known as a rendering pipeline that can illustrate the flow of operations taken to generate an image and/or frame.

Each image or frame comprises points, which are referred to vertices. The vertices are transferred to the memory of the GPU. Vertices are a combination or grouping of individual vertex. A vertex is a point in 3D space defined by its position (x, y and z coordinates) that defines the intersections of two or more lines. The vertices may then be moved through the stages of the GPU pipeline. The stages may include assembly. The shader stages are the programable functions that allow the vertices to be transformed from 3D points, to a 2D image. In some examples, there are multiple shader stages to generate a proper image, as can be seen in FIG. 1 that follows.

As illustrated in FIG. 1, a graphical processing system (100) includes interactions of an Advanced Reduced instruction set computing Machine (ARM) processor (120) and a GPU (130). The graphical processing system (100) has an ARM processor (120) working in conjunction with a GPU (130) to perform manipulations, and assembly of images. In this exemplary graphical processing system (100) the ARM processor (120) can include a vertex/index buffer (101) that can allow for the receiving and/or storage of a vertex dataset, which in the case of multiple vertex datasets they may colloquially be referred to as a vertices dataset. The dataset can then be buffered in an amount of data that can be handled by the assembler, shader, rasterizer, and other processing operations of the GPU (130). After the data and/or dataset have been processed, the processed data and/or dataset it may be transferred and/or sent to an ARM processor (140). In some examples, the ARM processor (120) and the ARM processor (140) are the same processor, while in other examples ARM processor (140) may be an additional processor.

The processing operation stages of the GPU (130) can be placed in a number of different orders depending on the application utilizing the graphical processing necessary. In one example, the stages include an assembler stage that allows for the data to be assembled into geometric shapes, these geometric shape datasets can then be processed by a shader stage which may include several different shader stages that then pass the processed data to a second assembly stage that allows for the assembly or re-assembly of the processed data, which can them be further processed by a second shader and operation stage that processes the individual pixels and generate an image dataset that can be output, sent and/or transferred to a buffer.

The GPU (130) includes processing stages ranging from data transformation via an input assembler (102) to image output via the output frame buffer (110). The overall process involves receiving a 3D dataset based on the output of a camera or other image creation system with an ARM processor (120), processing the 3D dataset with a GPU (103), colloquially referred to as GPU pipeline and outputting the processing image data to a frame buffer (110) running on an ARM processor (140). Both a vertex shader (103) and fragment shader (108) are programmable and depending on the size and complexity of geometry of the 3D dataset require a specific number of operations to be performed. In at least one example, such as an autonomous vehicle, the 3D dataset can include multiple cameras, with multiple views, and causing there to be complex geometry that must be rendered into 2D images. The size of output framebuffer (110) can also limit the number and speed of the specific operations required to render an image from the GPU. For example, if the output frame buffer (110) is half the size of the images, it may take two operations to output the images.

The computational power of the GPU is commonly described in terms of the number of floating point operations per second (FLOPS). Conventional GPUs that are able to execute 1,000,000,000 FLOPS are referred to as Giga FLOP (GFLOP) GPUs. An executing application may exceed the computational power of a GPU, causing the GPU to be delayed in processing. In at least one example, the delay can cause problems such a stuttering, or pauses in video from the delay in rendering and/or processing. These problems can lead to larger issues, such as in the case of an autonomous vehicle that relies on video imaging to avoid obstacles, resulting in crashes or possibly even death of an occupant.

In one example embodiment, an input assembler (102) receives vertex data from the vertex/index buffer (101) and forwards the data to a vertex shader (103). The input assembler (102) generates geometric patterns or shapes based on the positions of the points that make up the vertex data. These geometric patterns or shapes can then be processed by shader stages to create the effects and changes to allow a 3D dataset to appear as a 2D image. The vertex shader (103) transforms the 3D point data into a transformed dataset that may be further manipulated to refine and/or render a clear image. A vertex shader (103) is a graphics processing function that is programable by a user. The vertex shader (103) may be utilized in combination with other shaders to add special effects to the vertex data during processing of a 3D environment into a 2D image by performing mathematical operations on the vertex data. An object is defined using a set of vertices, within an image, with different points of the object needing different processing. In addition to position, a vertex can also have attributes like colors, texture coordinates, lighting and material properties etc. The vertex shader processes each vertex and performs one of the processing steps that transforms the vertex from 3D space to screen space (2D image). In some examples, the vertex shader may have fragments that are not drawable or renderable.

The transformed data can receive further processing with an optional tessellation shader (104), an optional geometry shader (105) and the data assembled in a primitive assembly (106) to generate an assembled dataset that includes assembled data. The assembled data if rendered would appear as a varying group of triangles of all shapes and sizes, or a set of vertex triangles. The assembled data with the vertex triangles passes to a rasterizer (107) for filling in the vertex triangles which are then passed to a fragment shader (108). Each attribute for vertices in a primitive assembly is interpolated and passed to the fragment shader (108). The rasterizer (107) converts the vertices to pixels, dots, and lines. The fragment shader (108) can process any of the shaded portions of the vertices including color and image depth. The input of the fragment shader (108) can be provided by the rasterizer (107). The output of the fragment shader will be captured in a color buffer which resides in the output buffer of the GPU. The contents of the output buffer are displayed on the screen.

Certain of the per sample operations (109) (like depth test, stencil test etc.) are then performed on the output of the fragment shader (108) before transmission to an output frame buffer (110) in an application running on the ARM processor (140).

FIG. 2 illustrates a frame rendering data flow in a graphics processing system. The x-axis (201) indicates the time. The y-axis (202) indicates the block performing operations on the frame. For example, during time (205), while the GPU pipeline is working on frame 2 (206), the ARM processor is working on frame 3 (207). However, if the ARM processor is capable of processing the frames faster than the GPU can accept them, or in another example, the GPU is unable to complete operations due to a restriction on it computational power or GFLOPS, then the frame can become delayed resulting in numerous potential problems. For example, as seen where the ARM processor sends two frames to the GPU prior to the GPU completing one frame.

FIG. 3 (300) illustrates the number of GFLOPS (302) required for various applications such as J6, J6+, J7Entry, J7Eco, J7 and RFQ as indicated on x-axis (301). As the complexity of application increases, the number of operations required increases substantially. For example, a J7 (304) application with a requirement of 300 GFLOPS may require a larger system on a chip (SOC) to execute as compared to an RFQ (303) application requiring 450 GFLOPS. However, a larger SOC is expensive to design, manufacture, and test. Therefore, there is a need to be able to handle applications varying computational requirements without increasing the size of the SOC. A graphics application is usually written using a well-defined application program interface API's like OpenGL that do not provide a convenient way to perform shader processing other than with the GPU. There is a need for the ability to increase computational power without increasing the size of the SOC.

SUMMARY

In one embodiment, a method for dynamically transferring of processing operations from a graphical processing unit (GPU) to a digital signal processor (DSP). The method includes analyzing a set of vertex data to determine the number of operations that would be needed to render an image. If the number of operations needed exceed the number of operations that a GPU can process, the processor can transfer a portion of processing operations to the DSP from the GPU along with transferring vertex data for processing. The DSP can then process the vertex data, and pass the transformed data to the GPU for further processing.

In another embodiment, a system for performing graphical image processing. The system includes a graphical processing unit (GPU), a digital signal processor (DSP) and a processor. The processor can analyze incoming image data to determine the number of operations the data will need to be processed, and compare with the computational limits of the GPU. If the processing operations will exceed the computational limit of the GPU the processor can transfer the processing operations to a DSP, along with the image data in order to maximize the effectiveness of each processor and receive minimize processing delays. The processor may be required to convert executable code from the format executable by the GPU to the format executable by the DSP, and generate a replacement portion of code for the GPU to allow it to begin processing the image data after the DSP has completed its processing operations and passed the data to the GPU.

BRIEF DESCRIPTION OF THE DRAWINGS

Aspects of the disclosure may be implemented in certain parts, steps, and embodiments that will be described in detail in the following description and illustrated in the accompanying drawings in which like reference numerals indicate similar elements.

DETAILED DESCRIPTION OF THE INVENTION

It should be noted that the term GPU, as used herein after to define a graphics processing unit, is used primarily for 3D applications. It should be noted that the term FLOPS is a standard measure of computing power to indicate Floating Point Operations per Second. It should be noted that the terms "GFLOPS" is one billion FLOPS. As an example, a 1 FLOP processor will perform one operation in a second. As another example, a 1 GFLOPS processor will perform one billion operations in a second. In addition, a 2 GFLOPS processor will perform two billion operations in a second.

Consequently, a 2 GFLOPS processor will perform twice as much computing work in the same time as a 1 GFLOPS processor. The term operations as used herein references a floating point operations of a processor. The term "DSP" as used herein is referred to a digital signal processor. The term Core as herein used refers to hardware that specifically performs a function in a GPU or a DSP. A processor may include multiple cores.

Figure 4:
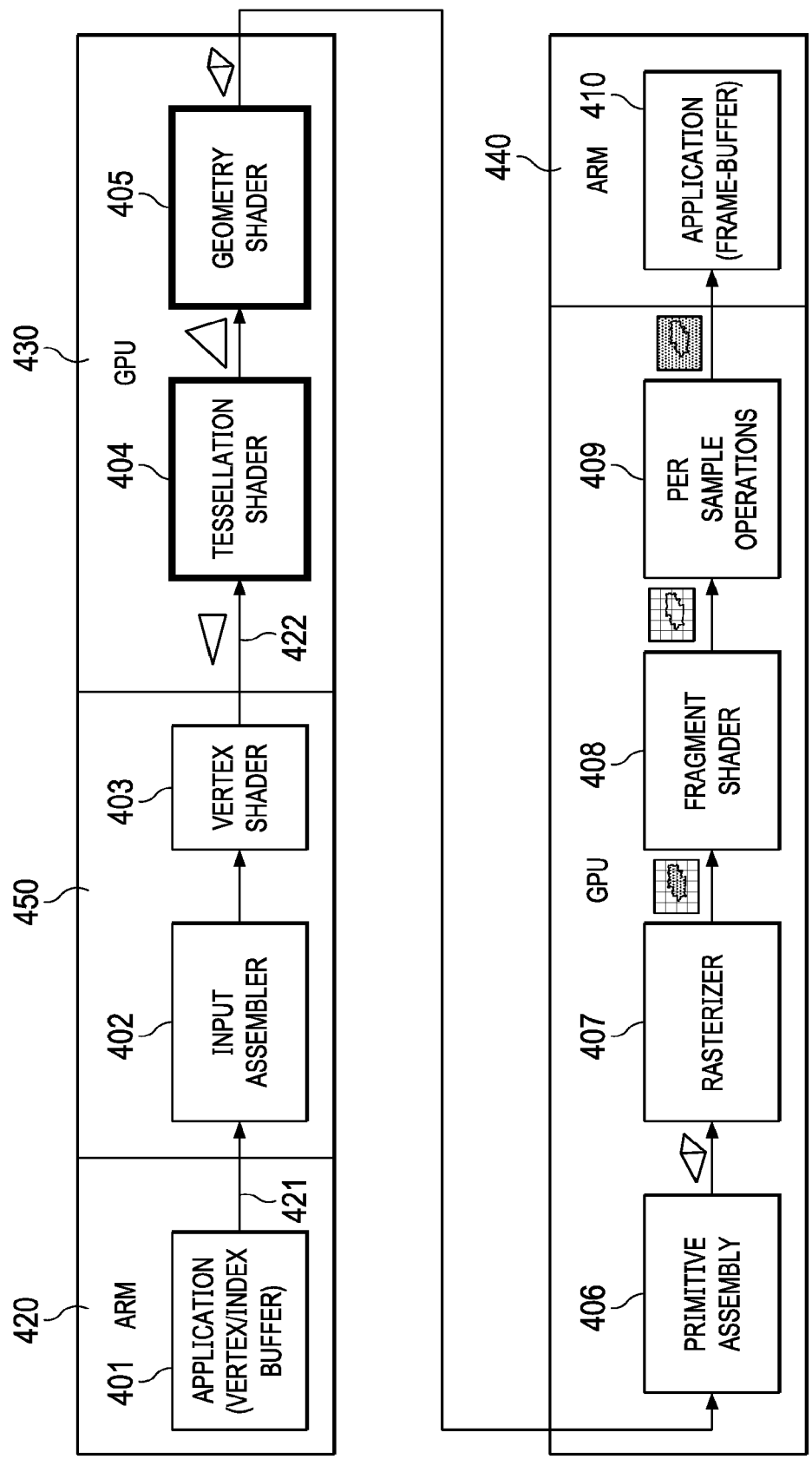
FIG. 4 depicts an exemplary flowchart for processing operations, according to one aspect of the present invention.

FIG. 4 generally illustrates a graphical processing system (400). The graphical processing system (400) illustrates collaboration between an ARM processor (420), a DSP (450), and a GPU (430). In at least one example, data is received by the ARM processor (420), which transfers the data to the DSP (450) and GPU (430) for processing, then being returned to ARM processor (440). Because processing operations can be dynamically transferred between the GPU and DSP, image processing is completed with minimal delays.

An application and/or application data is loaded into an ARM processor (420). In at least one embodiment, the application and or application data includes executable code from a computer readable medium that would allow the ARM processor (420) to receive or generate vertex data. The vertex data may be passed to a DSP (450) that can include execution of an input assembler (402) and/or a vertex shader (403). The instructions for executing the input assembler (402) and/or vertex shader (403) may be transferred from the GPU (430) to the DSP (450). The transfer can include conversion of code and/or pointing the DSP (450) to an appropriate portion of code stored in memory locations. A CPU processor such as an embedded ARM processor (420) may load program instructions to a DSP (450). The DSP (450) may preprocess the vertex data before passing it to the GPU (430). The ARM processor (420) can be configured to execute an operational requirement calculator that calculates the number of operations required for the data provided. In at least one embodiment, the operational requirement calculator, determines the number of operations required to execute the processing stages of the GPU (430), and compare with the FLOPS limit of the GPU (430). The number of cores available with a GPU (430) and/or DSP (450) may affect the FLOPS limits of the GPU (430) or DSP (450). If more operations are needed than are available from the GPU because of FLOPS limits, portions of the rendering operation or stages of processing of the GPU (430) may be transferred to a processor such a DSP (450). Upon completion of operations by the DSP (450), the transformed data may be stored in an external memory before being transferred to the GPU. In some examples, the DSP (450) may pass the transformed data to an internal memory of the GPU (430). In at least one embodiment, the transferred data may be passed directly to the next processing stage. In at least one example, the transformed data, the data processed by the DSP (450), can be stored in a vertex buffer object (VBO) format. The VBO format is a data format used by graphical processing code to store and manipulate data during processing. The vertex shader (403) or other DSP (450) executed processing stage, when executed may then read the transformed vertices from the external memory and pass the data to the tessellation shader (404) and/or the next stage of the GPU (430).

In at least one embodiment, the DSP (450) enables the passage of data from the input (421) of the input assembler (402), to the output (422) of the vertex shader (403). The ARM processor (420) transfers and/or directs data to the DSP (450) for processing, while directing the GPU (430) to await the processing by the DSP (450). The pass through allows the DSP (450) to complete processing operations, while the GPU (430) is completing processing operations on the previous frame. For example, the GPU (430) upon completion of its processing operations can execute the pass-through code that points the location where the transformed data processed by the DSP (450) is stored, and execute the tessellation shader (404) processing operation. Processing by the input assembler (402) and vertex shader (403), when executed by the DSP (450) allows the GPU (430), and/or the processing stages of a GPU pipeline flowing without disruption, as these operations can cause delays by executing too quickly, or too slowly based on the size and complexity of the data and processing operations. Any disruption, such as a delay or processing error, can cause the application and/or system to fail. The passage of data from the input (421) of the input assembler (402) to the output (422) of the vertex shader (403) is transparent to the application executing the programmable code. The application utilizing the processing system (400) would only see and/or interact with the GPU API, allowing the DSP to execute the programmable code without the application knowing the processing system (400) is utilizing the DSP or other processing in conjunction with the GPU. In at least one example, additional processors may be utilized to perform processing operations in conjunction with the GPU. The processing system (400) could be implemented with any combination of processors, DSPs, and/or GPUs.

In at least one embodiment, the graphics processing system (400) is a part of a system on a chip that can rely upon executable code stored on a computer readable medium. Upon execution of an executable code, an input assembler (402) and/or vertex shader (403) may be implemented by a DSP (450), allowing a first set of the operations to be completed with the DSP (450) prior to a second set of operations such as, the tessellation shader (404), geometry shader (405), primitive assembly (406), rasterizer (407), fragment shader (408), and certain per sample operations (409), that are completed by a GPU (430), as part of a GPU pipeline. In other embodiments, other operations such as the tessellation shader (404), geometry shader (405), primitive assembly (406), rasterizer (407), fragment shader (408), and certain per sample operations (409) may also be completed by the DSP (450).

Figure 1:
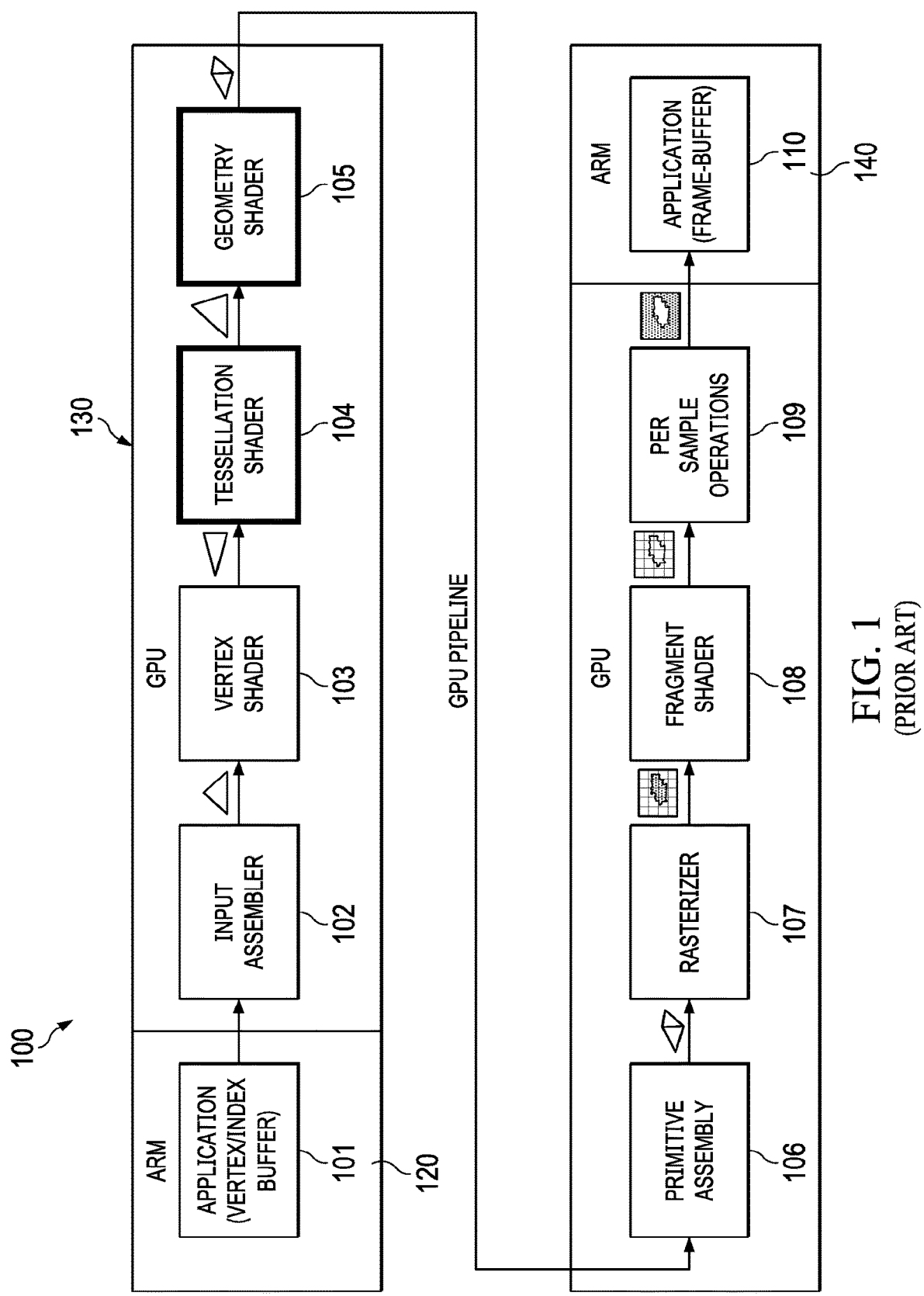
FIG. 1 illustrates a prior art processing operation flow diagram for graphics applications.
Figure 2:
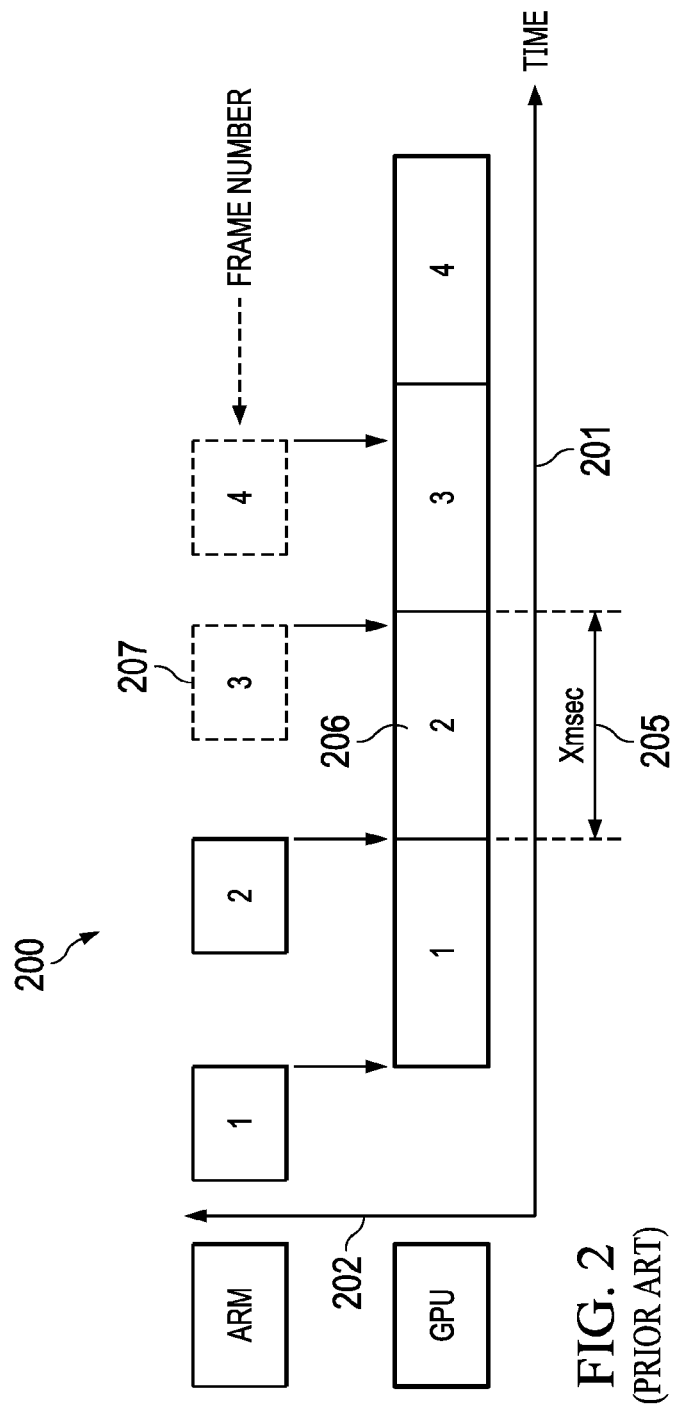
FIG. 2 illustrates a prior art GPU pipeline stages for graphics applications.
Figure 3:
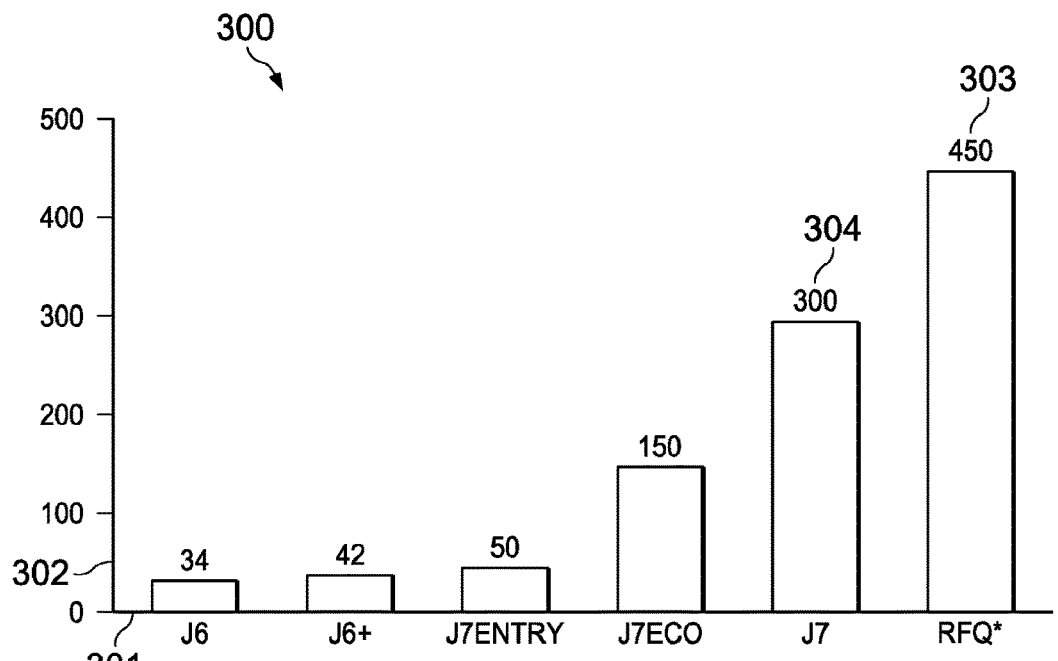
FIG. 3 is a chart illustrating GFLOPS requirement for graphics applications.

The input of the fragment shader (408) will be provided by the rasterizer (407) and the output of the fragment shader (408) will be received by a frame buffer (410). The contents of the buffer (410) may be displayed on a screen after all the GPU cores tasked for executing processing operations are complete. In at least one embodiment, some of the processing operation and/or tasks may be completed in parallel with GPU cores handling individual tasks. In at least one embodiment, the DSP (450) allows for vertices data to be received at the input of a vertex shader (403) from the input assembler (402) and transformed, thereby relieving the GPU (430) from operations that would have been constrained by the GPU cores and GPU resources. The ability to leverage an on chip processor such as a DSP (450) for performing operations that would be constrained by FLOPS limit reduces the need for excessive GPU cores on the chip and therefore reduces the area of the chip and the power requirements of the chip. In some instances, the dynamic transferring of operations from a GPU (430) to a DSP (450) may reduce the area of chip needed for GPU cores by more than 50%. In other instances the dynamic transferring of operations from a GPU (430) to a DSP (450) may reduce the area of chip needed for GPU cores by more than 25%. For example, if an operation requires 450 GFLOPS as shown in FIG. 3, the chip area and the GPU cores required to support the GFLOPS may be 45 mm². However, a configuration with 300 GFLOPS assigned to the GPU (430) may be used in conjunction with a DSP (450) that executes operations that equate to 150 GFLOPS can allow for a reduction in the number of GPU cores utilized and reduce the chip area to 30 mm². The GFLOPS computational limit of the processor means that for a given time frame (4 seconds), the number of operations cannot exceed the GFLOPS limit (for example 150 GFLOPS), multiplied by the time frame. Thus, in this example, the number of operations cannot exceed 600,000,000,000 operations in that four seconds.

The ability to calculate and/or estimate the number of operations needed for a processing operation dynamically enables software applications to transfer operator to a DSP thereby reducing and/or eliminating the need for additional chip area and power that would be required of a GPU for the same number of operations.

Figure 5:
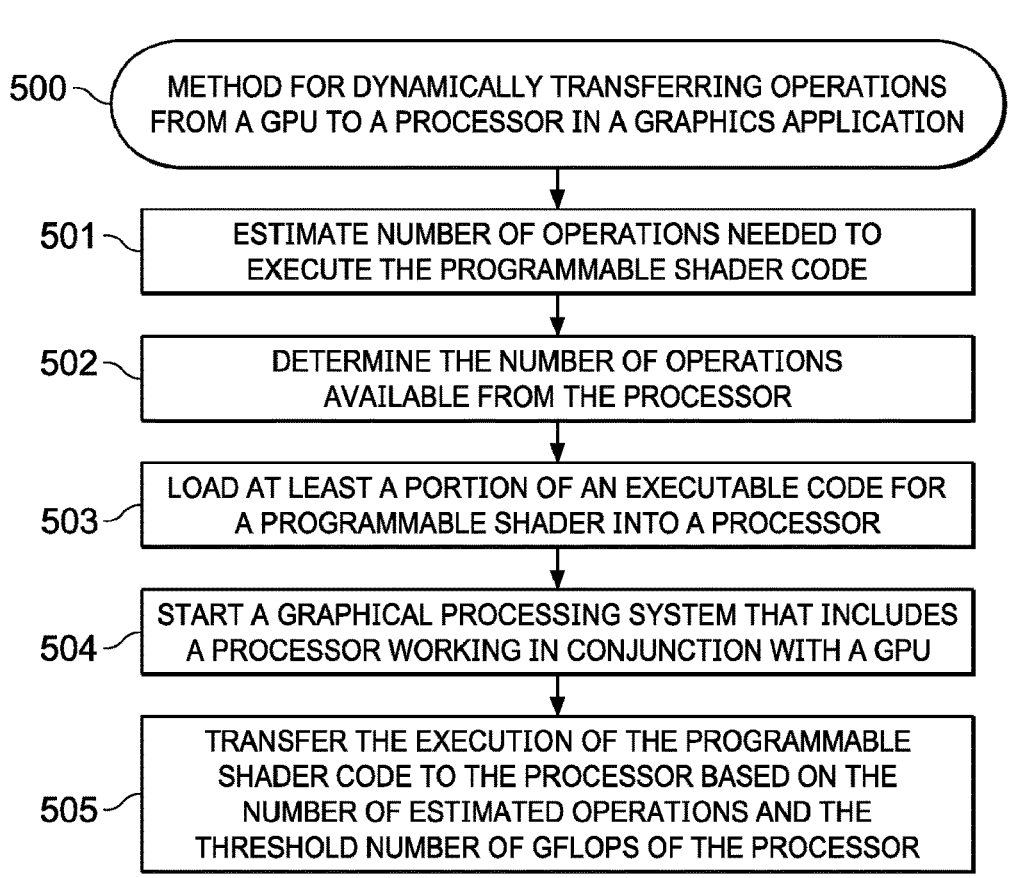
FIG. 5 illustrates an exemplary flowchart for offloading GFLOPS to a DSP, according to one aspect of the present invention.

As generally seen in FIG. 5 (500), a method for dynamically transferring operations from a GPU, executed in a GPU pipeline to a DSP outside of the GPU pipeline may be generally described in terms of several steps. The method estimates the number of operations needed to execute the programmable shader code (501) and/or other processing operations of a GPU pipeline. In at least one embodiment, an operational requirement calculator or algorithm is executed by a processor to estimate the number of operations needed to perform the vertex transformation in the vertex shader and/or other processing operations of the GPU pipeline. The number of operations may be determined an estimated average of 450 GFLOPS in order to complete the transformation; in at least one example, this would be a GFLOPS limit. This step may be performed prior to execution of other code(s) and/or operation(s) in the GPU pipeline. In some examples, the vertex transformation can be performed in parallel across all the available GPU cores with assembly by the final image/buffer for a display or screen. The ability to perform operations in parallel may allow the application to be executed with additional operations by the DSP and/or GPU. In at least one example, the shader and/or GPU pipeline operations may remain parallel based on threading or hyperthreading principles across multiple cores. Another example would have an individual operations performed on an individual core, with other cores turning similar operations at different stages simultaneously. It is possible that the number of GFLOPS required for each shader and/or stage of a GPU pipeline is different and based on the complexity of the shader or processing requirements.

Next, the method determines the number of operations available from a DSP (502). In at least one example, the number of available operations from the DSP should be equal to or greater than the difference of the estimated number of operations and the threshold number of available operations from the GPU and/or GPU cores. The number of available GPU cores is limited on a given chip and the number is fixed. Additionally, the number of operations is fixed based on the number of cores of the processor. For example, the number of GPU cores in a chip may be 300 GPU cores, each of these GPU cores allows for a specific amount of processing. For example, in a low intensity (low number of operations) rendering the number of operations performed by the GPU and/or GPU cores may be less than 200 GFLOPS, while a high intensity (high number of GFLOPS) application may require 500+ GFLOPS per frame causing the GPU pipeline to back up and cause the rendering of images to be delayed.

The next step involves loading at a portion of an executable code for a programmable shader into the DSP (503). The programmable shader, in at least one example, is a vertex shader. Other examples of a programmable shader could include a tessellation shader, a geometry shader, a fragment shader, or other shaders that are capable of being dynamically updated and/or programmed. At a minimum, the vertex shader calculates the projected position of the vertex when changed and/or transformed from 3D to 2D. The change and/or transformation, in at least one example, includes the positioning of the vertex at a given point for a screen visible by a user. The vertex shader can also generate other varying outputs, such as a color or texture point coordinates, for the rasterizer to blend. The programmable code for a vertex shader may be loaded into the GPU and/or a processor with a CPU such as a DSP. A software hardware interaction for loading the programmable code is generally illustrated below with respect to FIG. 8.

Next, the method starts a graphical processing system that includes a DSP operating in conjunction with a GPU pipeline for rendering an image (504). Following the rendering step, the method transfers a programmable shader code and execution of the code to the DSP based on the difference between the estimated number of operations and the threshold number of GFLOPS (505). For each processing stage, if the threshold number of a GFLOPS is less than the estimated number of operations as determined by the operational requirement calculator or algorithm, a portion of the operations may be transferred to a processor such as a DSP. In some instances, if the threshold number of GFLOPS is equal or more than the estimated number of operations as determined by the operational requirement calculator or algorithm, the GPU pipeline can process the data without transferring any operations to the DSP. In at least one embodiment, the operational requirement calculator or algorithm (not shown) estimates the complexity of the processing stage based on the executable code to determine the number of operations it will require. In some examples, the operation requirement calculator or algorithm may also analyze the vertex data to determine the volume of data to be required. If the estimated number of operations exceeds the threshold number of GFLOPS then a portion of the processing stage executed code may be dynamically transferred to a DSP. The graphics application in the method may be any application utilizing the GPU. In at least one example, the transferring step in the method is transparent to the graphics application. The transferring step may be performed seamlessly without the application running the GPU being aware of the transferring of operations between the GPU and the DSP. In other instances, the graphics application is aware of the transferring step and may include additional operations.

Figure 6:
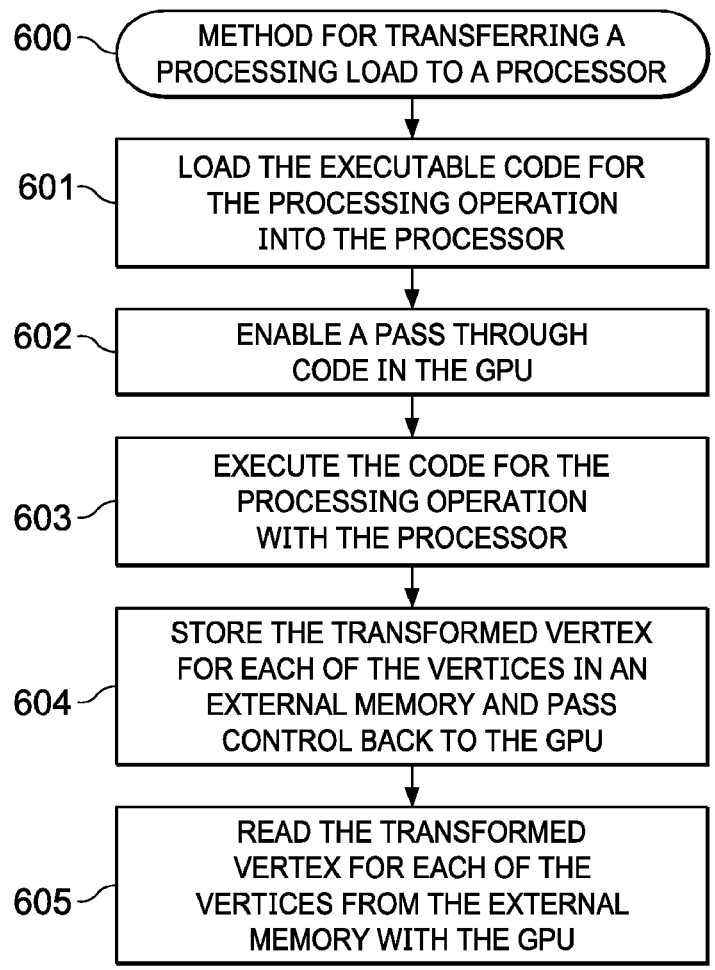
FIG. 6 illustrates an exemplary interaction flowchart for dynamically offloading GFLOPS to a DSP, according to one aspect of the present invention.

FIG. 6 generally illustrates an interaction method for transferring a processing load to a DSP (600). In step (601), the executable code for a processing operation is loaded into a processor (601). In at least one example, the executable code for the processing operation may be loaded into a processor such as a DSP in a DSP compatible format from a code storage location, such as a GPU code storage location. In at least one embodiment, the GPU code storage location is within a memory storage device coupled to the GPU. In some examples, the executable code is converted from a format readable and/or executable by the GPU to a format readable and/or executable by the DSP. In at least one embodiment, the DSP executes processing operations on the vertex data in place of the processing operations of the GPU.

In step (602), the method enables a pass through code in the GPU. In at least one example, the pass through code may be generated and/or transferred to a GPU code storage location. The pass through code can be configured to allow the GPU to complete previously assigned tasks and/or allow for parallel processing. The pass through code when executed by the GPU allows the GPU to receive the output of the processing operation, executed by the DSP with one or more of the processing operations of the GPU. For example, the GPU during execution of the pass through code will be pointed to a specific storage or memory location where the DSP executed processing operations will store the transformed data upon the conclusion of processing. In at least one example, the processing operations executed by the GPU can be executed in parallel, with all being pointed to specific storage or memory locations for each portion of data to be processed by the GPU executed processing operations. The assignment of an input of a GPU executed processing stage to the output of the DSP executed processing operation preserves the GPU pipeline during execution and allows the pipeline to continue unaffected while the DSP performs specific stages of the processing operations. While the output of a DSP executed processing stage is discussed being assigned to an input of a GPU executed processing stage, the output of the GPU processing stage could be assigned to the input of a DSP executed processing stage. These inputs and outputs are the beginnings or endings of processing operations. In at least one example, the input may access data stored in memory and/or receive a pointer to a location in memory for the data. The output may store the data in memory and/or pass a pointer to the location of the data in memory.

The method then executes the executable code for a processing operation in step (603). In at least one example, the enabling of the GPU pipeline may also trigger the DSP to execute the executable code. In the case of a vertex shader or the executable code for a vertex shader, each of the vertices is transformed into corresponding transformed vertices. In some examples, the transformed vertices are in a VBO format or other format capable of being processed by the GPU and/or DSP.

In step (604), the method stores the transformed vertex for each of the vertices in an external memory and in the DSP, the processing of the transferred vertices continues with the GPU. The transformed vertices may be stored in a VBO format in memory such as an internal or external DDR memory. It should be noted, that the transfer may include passing controls and/or access control between the GPU and the DSP. A device driver may also keep track of the state of the GPU pipeline and/or operations performed by the DSP.

In step (605), the method reads the transformed vertex for each of the vertices from the external memory with the GPU and the GPU pipeline may read the stored transformed vertices as preprocessed vertices. The transformed vertices may then be utilized by the other processing operations, and/or stages of the GPU pipeline.

Figure 7A:
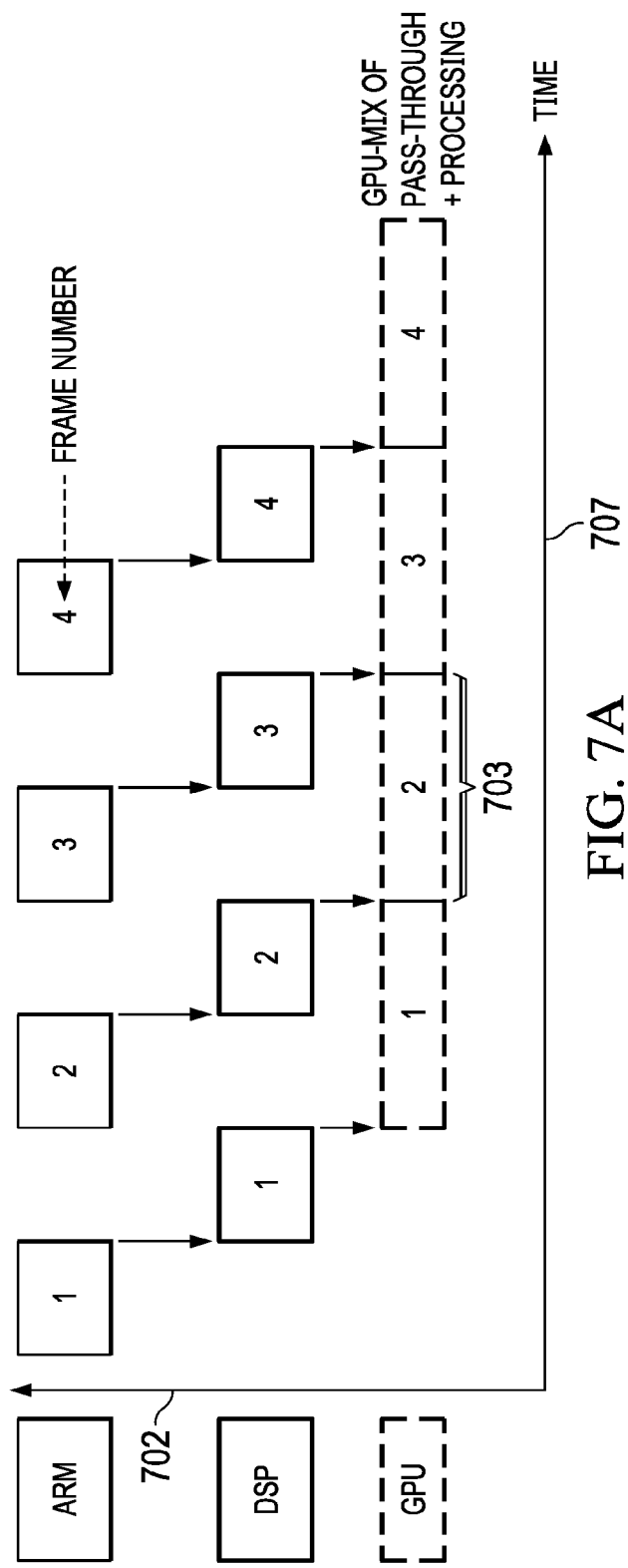
FIG. 7A depicts an exemplary embodiment of 3-stage GPU pipeline between ARM, DSP and GPU, according to one aspect of the present invention.

FIG. 7A (700) depicts a data flows of a 3-stage GPU pipeline. The X-axis (701) indicates time in relation to frame number, while the y-axis (702) indicates the execution of processing or data manipulation, ARM processor, DSP, or GPU. The pipeline stages may include a first stage in the ARM processor that loads an executable code for a processing operation into a DSP along with the vertices data, a second stage with the DSP executing the executable code to perform the processing operations with the DSP and a third stage that includes the GPU for finalizing and/or rendering the transformed vertices through additional processing. As shown below in the 3-stage pipeline, the processor (ARM) works in stage 1, while DSP works during stage 2, and the GPU is utilized in stage 3. In at least one embodiment, the stages may be working in parallel on sequential frames (stage 1 working on frame N, stage 2 working on frame N−1, and stage 3 working on frame N−2). For example, the ARM processor may be processing a frame 4, while the DSP may be transforming the previous frame 3 and the GPU processing an immediately previous frame 2. As shown in FIG. 7A during time period (703), GPU may be working on frame 2, while DSP and ARM processor and on frame 3. In general, the ARM processor may be preparing a frame N, while DSP may be transforming the previous frame N−1 and the GPU processing an immediately previous frame N−2, wherein N may be any positive integer greater than 2. In terms of the blocks in the chip, the ARM processor may be running an operational requirement calculator program or algorithm to determine if the data and/or the executable code should be transferred to the DSP for execution of processing operations. The ARM processor can initiate the transfer of the data, and any executable code from the GPU to the DSP for execution by the DSP, while the DSP is executing the executable code for processing operations, and the GPU is working with the remaining shaders and/or processing operations in the GPU pipeline. The pipeline stages/frames and the associated blocks may be represented as follows.

$$\text{ARM(Stage 1)} \Rightarrow \text{DSP(Stage 2)} \Rightarrow \text{GPU(Stage 3)} \quad (1)$$

$$\text{ARM(Frame } N) \Rightarrow \text{DSP(Frame}(N-1)) \Rightarrow \text{GPU(Frame } N-2) \quad (2)$$

$$\text{ARM(Input Assembly)} \Rightarrow \text{DSP(Vertex Shader)} \Rightarrow \text{GPU (Remaining Pipeline)} \quad (3)$$

Figure 7B:
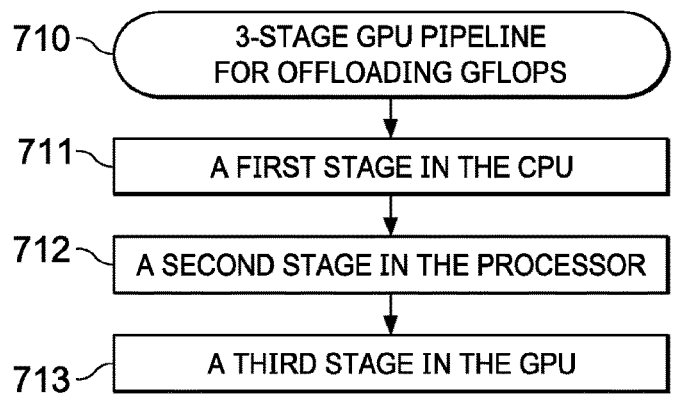
FIG. 7B depicts an exemplary flowchart embodiment of a 3-stage GPU pipeline between ARM, DSP and GPU, according to one aspect of the present invention

FIG. 7B (710) illustrates a 3-stage graphical operation system that includes transferring processing operations to a DSP. A first stage in a central processing unit (CPU) (711). In at least one embodiment, the CPU can be an ARM processor. The first stage (711) may also include execution of an operational requirement calculator program or algorithm by the CPU to determine if a portion of the executable code for a processing operation should be transferred to the DSP to avoid over taxing the GPU. A second stage (712) can be operated in the DSP. The DSP may perform operations or processes and/or execute code that performs operations, and then transfers the manipulated data to the GPU for further operations and/or processing. A third stage (713) is the operations by the GPU. The GPU can perform various shading, rendering, and processing to the data allowing it to generate an image or frame. An optional fourth stage may be performed by a processor for an individual pixel processing operation. The processor may be the DSP or the ARM processor.

Figure 8A:
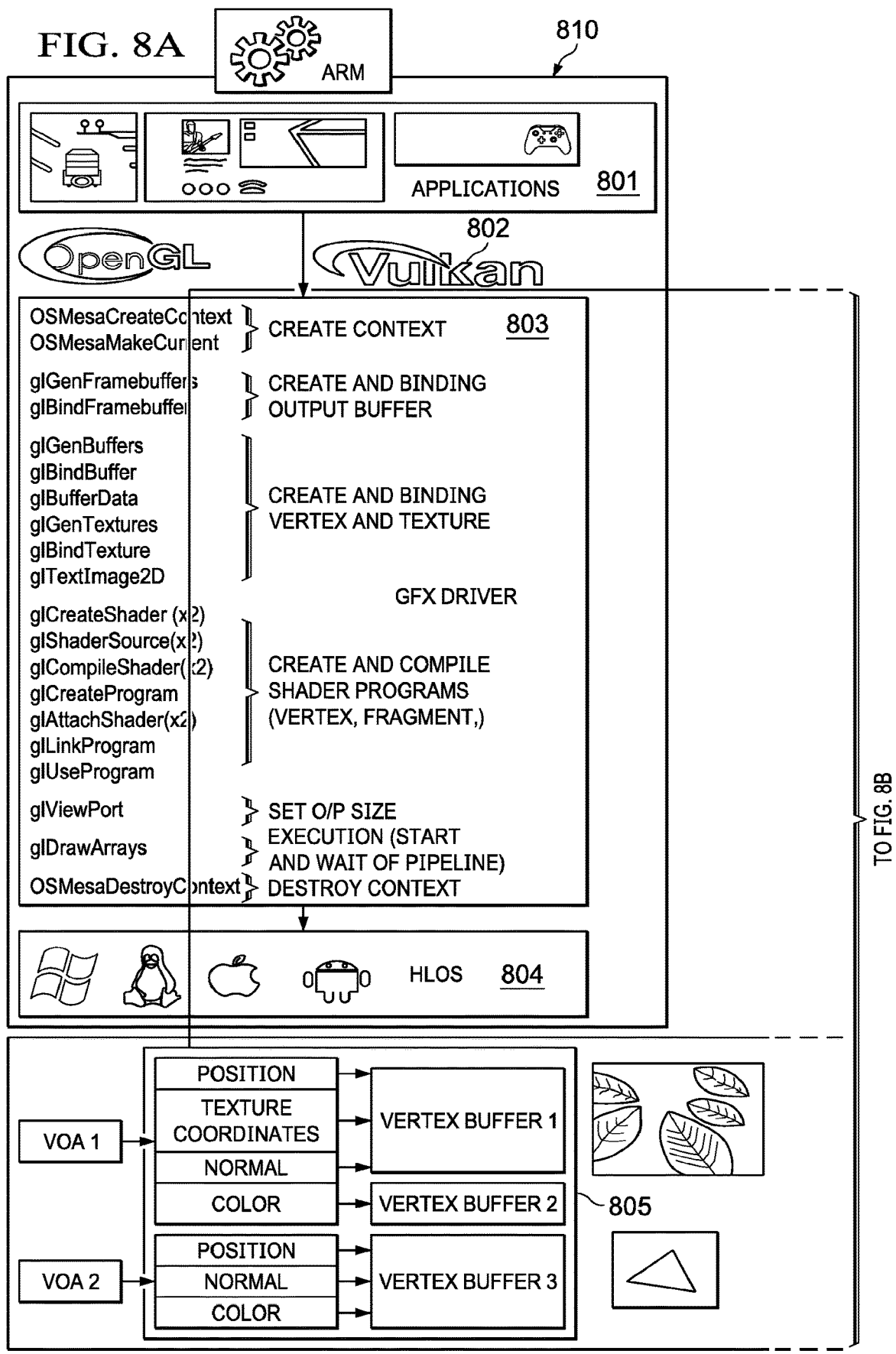
FIG. 8A and FIG. 8B illustrate another exemplary interaction chart for dynamically offloading GFLOPS to a DSP, according to one aspect of the present invention.
Figure 8B:
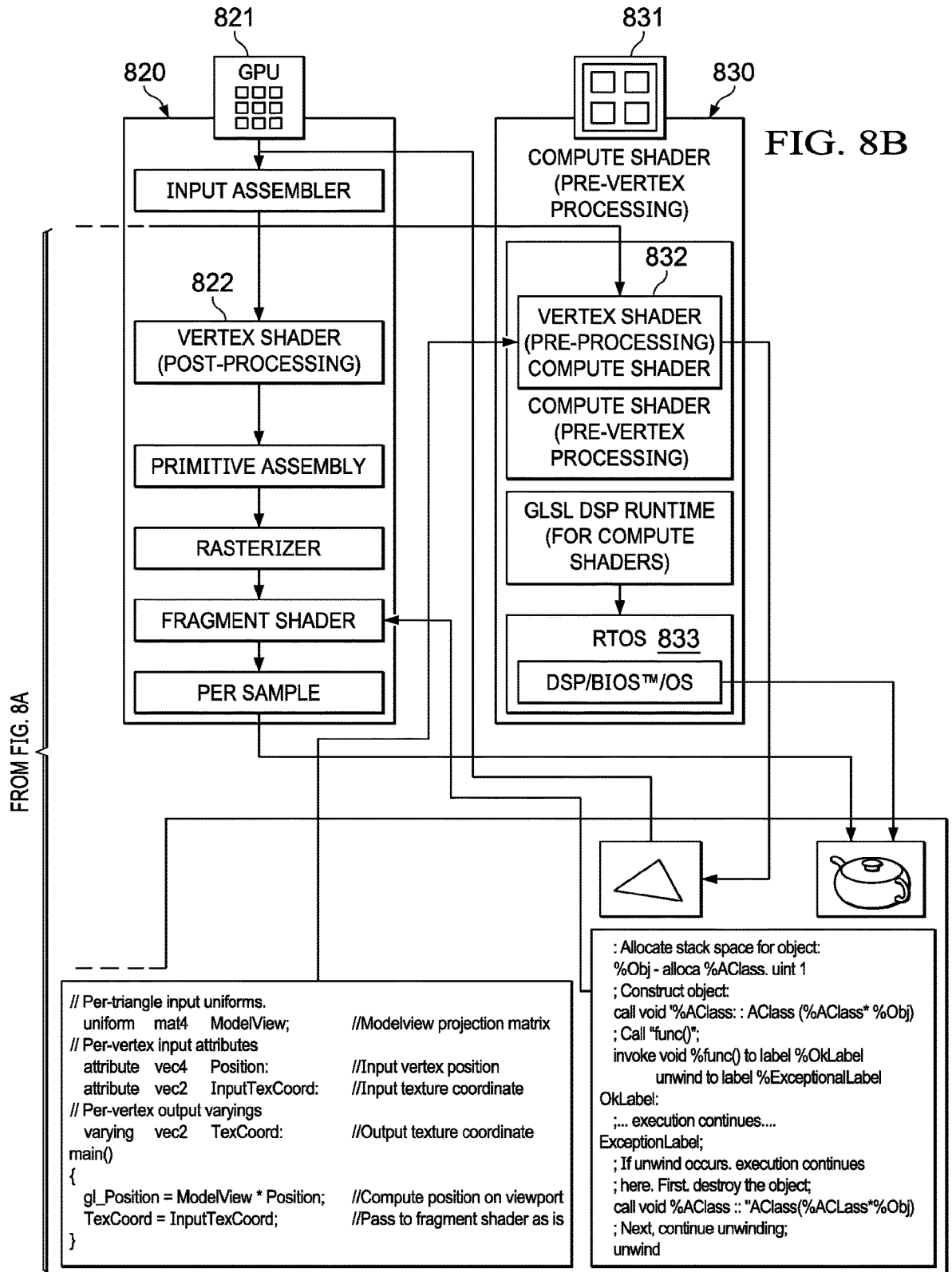

FIG. 8A and FIG. 8B illustrates a software, driver and hardware interaction for transfer processing operations from a GPU to a DSP. A graphics application (801) such as a gaming application, navigation application or an automobile application sends commands or code through an array oriented programming language (APL) (802) such as Vulkan or OpenGL to a graphics driver (803). In at least one embodiment, the graphics driver (803) can interface with a high level operating system (HLOS) (804). The HLOS (804) may be running on an ARM processor or other CPU. The graphical driver (803) interacts with the hardware for the GPU pipeline (820) and the DSP operation (830). The GPU (821) may receive instructions from the CPU or the graphics driver (803) and initiate the GPU pipeline (820). The programmable code (805) for the programmable shader processing (832) may be loaded into a processor such as a DSP (831) in a format compatible with the DSP. A real time operating system RTOS (833) running on the DSP may load and execute the code on the DSP. The DSP may perform a processing of the vertices similar to a vertex shader. The processing operations of a vertex shader are in effect transferred to the DSP. In at least one example, a pass through code is created by the CPU and/or HLOS and/or loaded into a vertex shader (822) stage position of the GPU pipeline to allow the DSP processed data to be transferred back to the appropriate stage of the GPU pipeline without causing duplicate processing. The processing control of the DSP (830) may be passed back to the GPU (820) when all the transformed vertices are stored in an external memory (not shown) and/or transferred to the appropriate stage of the GPU pipeline (820). The driver (803) can track the state and/or stage of the GPU pipeline (820) and/or the status of the DSP (831).

Figure 9:
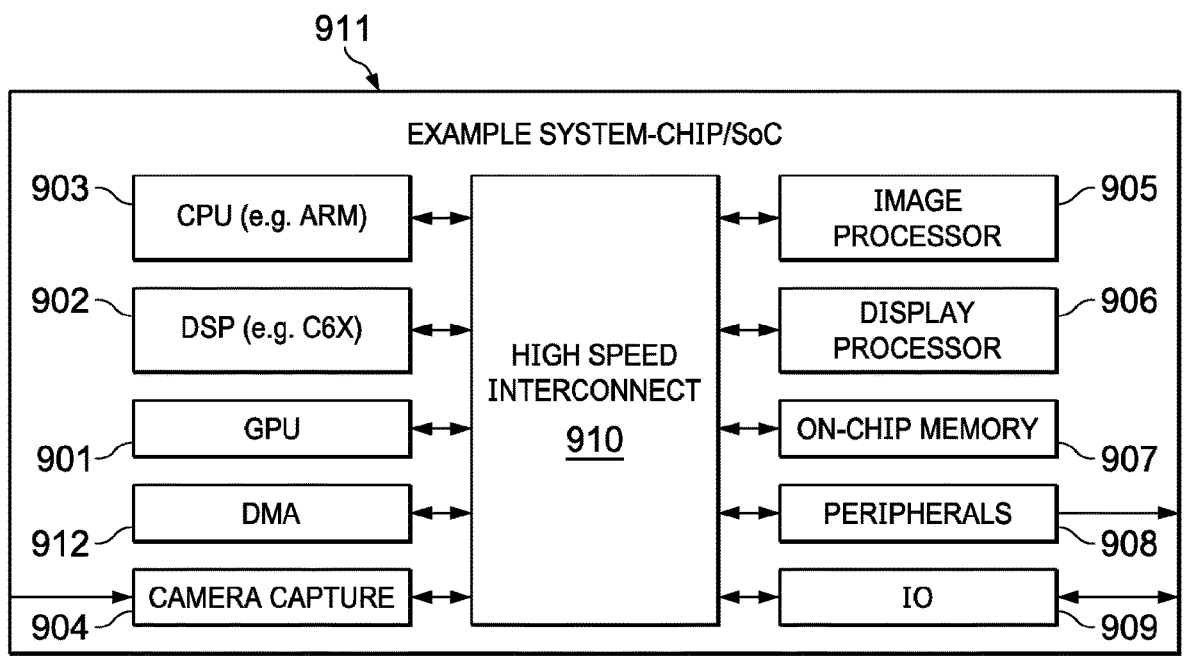
FIG. 9 illustrates an exemplary system for dynamically offloading GFLOPS to a DSP, according to one aspect of the present invention.

FIG. 9 (900) illustrates a system-on-a-chip (SOC) (911) for dynamically transferring processing operation and from a GPU (901) to a DSP (902). The CPU (903) can load an executable code into and/or point a GPU (901) or a DSP (902) to a specific executable code. The SOC (911) can also include a direct memory access (DMA) engine (912) that allows certain hardware subsystems to access an on-chip memory (907) independent of the CPU (903). A camera capture (904) block may capture images or video for processing and forward the image or video to the GPU (901) or image processor (905) for rendering. In at least one example, the camera capture (904) may store other images or vide in a memory (907). The image processor (905) may process the image or video and forward the processed image to the GPU (901) for further processing. A display processor may receive an output dataset from an output buffer from the GPU and configure the out part dataset for display on a screen. In at least one example, the output dataset is a rendered image or video. The other portions of the system may include an input/output bus (909) for receiving and transmitting signals external to the SOC (911). The input/output bus (909) may be a GPIO (general purpose I/O) in some examples. The peripheral block (908) may be configured to interact with peripheral components internally and externally such as, a user interface, mouse, keyboard or other user interface devices. An interconnect bus (910) controls the flow of data from one portion of the SOC to another portion of the SOC. For example, the interconnect bus (910) may forward an input image or video from the camera capture (904) block to the image processor (905). The protocol used for the bus may be any general purpose protocol that can prioritize operations, data transfers, and execution based on user programed data prioritization. An external memory (not shown) may be connected to the SOC (911) via the input/output bus (909) or for storing data through the peripheral block (908). After the GPU (901) passes processing control and the vertex data (or vertices for multiple vertexes) to the DSP (902), the DSP (902) transforms the vertices data into transformed vertices (function of a vertex shader) that can be stored in a VBO format in an external memory such as a DDR memory or on-chip memory (907). The processing control may be transferred from the DSP (902) back to the GPU (901) when all the transformed vertices are stored in the external memory or on-chip memory (907).

What is claimed is:

1. A method comprising:
   transferring a set of vertex data to a Digital Signal Processor (DSP) in response to determining that processing of the set of vertex data by a graphics processing unit (GPU) exceeds a processing capability of the GPU;
   transferring from the GPU to the DSP, code executable by the DSP to transform the set of vertex data;
   receiving, by the GPU, a transformed set of vertex data from DSP in a format capable of being processed by the GPU; and
   processing, by the GPU, the transformed set of vertex data.

2. The method of claim 1, wherein the code comprises code for a shading operation.

3. The method of claim 1, wherein the transferring the code further comprises generating a pass-through code for the GPU.

4. The method of claim 1, wherein the transferring the code further comprises converting the code from a GPU executable format to a DSP executable format.

5. The method of claim 1, further comprising transferring control of processing the set of vertex data to the DSP from the GPU.

6. The method of claim 5, further comprising transferring control of processing the transformed set of vertex data from the DSP to the GPU after the GPU receives the transformed set of vertex data from the DSP.

7. The method of claim 1, further comprising performing additional shader operations on the transformed set of vertex data.

8. The method of claim 1, further comprising assembling the transformed set of vertex data.

9. The method of claim 1, wherein processing the first set of vertex data with the DSP is performed transparently to an application executing programable code.

10. The method of claim 1, wherein receiving the transformed set of vertex data comprises receiving the transformed set of vertex data in a vertex buffer object format.

11. The method of claim 1, wherein determining that processing of the set of vertex data by the GPU exceeds a processing capability of the GPU includes determining a number of operations needed to process the set of vertex data by the GPU and comparing the determined number of operations to a computational limit of the GPU.

12. A system comprising:
    a graphical processing unit (GPU);
    a digital signal processor (DSP) configured to perform processing operations;
    a processor coupled to the GPU and the DSP, the processor configured to estimate a processing capability of the GPU with respect to a set of vertex data;
    wherein the system is configured to:
      transfer the set of vertex data to the DSP based on the estimate;
      transfer, from the GPU to the DSP, code executable by the DSP to transform the set of vertex data;
      receive, by the GPU, a transformed set of vertex data from the DSP in a format capable of being processed by the GPU; and
      process, by the GPU, the transformed set of vertex data.

13. The system of claim 12, wherein the processor converts the code from a GPU executable format into a DSP executable format.

14. The system of claim 12, wherein the processor replaces the executable code on the GPU with replacement code executable by the DSP.

15. The system of claim 12, wherein control of processing the set of vertex data is passed to the DSP when the set of vertex data is transferred to the DSP.

16. The system of claim 12, wherein control of continued processing of the transformed set of vertex data is passed from the DSP to the GPU after the GPU receives the transformed set of vertex data from the DSP.

17. The system of claim 12,
wherein the GPU processes the transformed set of vertex data with additional shader operations, and
wherein the additional shader operations comprise one or more of a tessellation shader, a geometry shader, or a fragment shader.

18. The system of claim 12, wherein the GPU assembles the transformed set of vertex data.

19. The system of claim 12, wherein the GPU performs certain per samples operations and rasterizes the transformed set of vertex data.

20. The system of claim 12, wherein the DSP is configured to process the set of vertex data transparently to an application executing programable code.

21. The system of claim 12, wherein the DSP is configured to store, in a memory, the transformed set of vertex data in a vertex buffer object format.

22. The system of claim 12, wherein the processor is configured to determine whether the estimated processing capability of the GPU with respect to the set of vertex data exceeds a computational limit of the GPU.

* * * * *